(12) United States Patent
Hommura et al.

(10) Patent No.: US 10,035,898 B2
(45) Date of Patent: Jul. 31, 2018

(54) METHOD FOR PRODUCING LIQUID COMPOSITION, METHOD FOR PRODUCING COATING LIQUID FOR FORMING CATALYST LAYER, AND METHOD FOR PRODUCING MEMBRANE ELECTRODE ASSEMBLY

(71) Applicant: ASAHI GLASS COMPANY, LIMITED, Chiyoda-ku (JP)

(72) Inventors: Satoru Hommura, Chiyoda-ku (JP); Hiroyuki Watabe, Chiyoda-ku (JP); Masahiro Kaseda, Chiyoda-ku (JP); Toshihiro Tanuma, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/799,205

(22) Filed: Oct. 31, 2017

(65) Prior Publication Data

US 2018/0051159 A1 Feb. 22, 2018

Related U.S. Application Data

(63) Continuation of application No. PCT/JP2016/072679, filed on Aug. 2, 2016.

(30) Foreign Application Priority Data

Aug. 21, 2015 (JP) ................. 2015-163726

(51) Int. Cl.
*C08K 5/02* (2006.01)
*C08K 5/06* (2006.01)
(Continued)

(52) U.S. Cl.
CPC ............... *C08K 5/02* (2013.01); *C08K 5/06* (2013.01); *C08L 27/12* (2013.01); *C08L 29/10* (2013.01);
(Continued)

(58) Field of Classification Search
CPC .. C08K 5/02; C08K 5/06; C08L 27/12; C08L 29/10; H01M 4/8828; H01M 4/926; H01M 2008/1095
(Continued)

(56) References Cited

U.S. PATENT DOCUMENTS 8,597,855 B2 * 12/2013 Hommura ........... C08F 214/182
429/483
9,692,073 B2 * 6/2017 Hommura ........... H01M 8/1023
(Continued)

FOREIGN PATENT DOCUMENTS

JP 8-236122 9/1996
JP 3394836 4/2003
(Continued)

*Primary Examiner* — Michael M Bernshteyn
(74) *Attorney, Agent, or Firm* — Oblon, McClelland, Maier & Neustadt, L.L.P.

(57) ABSTRACT

To provide a method for producing a liquid composition or a coating liquid for forming a catalyst layer, which can make cracking less likely to occur at the time of forming a solid polymer electrolyte membrane or a catalyst layer; and a method for producing a membrane electrode assembly, which can make cracking less likely to occur at the time of forming the catalyst layer or the solid polymer electrolyte membrane. This liquid composition is prepared by dispersing in a medium containing water and a hydrocarbon-type alcohol a polymer (x) having a structural unit having a ring structure and a structural unit having an ion exchange group, or a polymer (y) having either one or both of a structural unit having two ion-exchange groups in a pendant group and a structural unit having one ion exchange group in a short-chain pendant group, to prepare a dispersion in which the concentration of the polymer (x) or the polymer (y) is from 10 to 26 mass %, and mixing the dispersion and a fluorinated solvent so that the sum of the concentration of the polymer (Continued)

(x) or the polymer (y) and the concentration of the fluorinated solvent becomes to be from 12 to 35 mass %.

12 Claims, 1 Drawing Sheet

(51) Int. Cl.
- *C08L 27/12* (2006.01)
- *C08L 29/10* (2006.01)
- *H01M 4/88* (2006.01)
- *H01M 4/92* (2006.01)
- *H01M 8/1018* (2016.01)

(52) U.S. Cl.
CPC ......... *H01M 4/8828* (2013.01); *H01M 4/926* (2013.01); *H01M 2008/1095* (2013.01)

(58) Field of Classification Search
USPC .......................................................... 521/27
See application file for complete search history.

(56) References Cited

U.S. PATENT DOCUMENTS

| | | | | |
|---|---|---|---|---|
| 2008/0138685 A1* | 6/2008 | Kaneko | ................... | C08J 5/225 |
| | | | | 429/483 |
| 2008/0193821 A1* | 8/2008 | Shimohira | ............... | C08J 5/225 |
| | | | | 429/493 |
| 2011/0027677 A1* | 2/2011 | Hommura | .............. | C08J 5/2237 |
| | | | | 429/428 |
| 2011/0027688 A1* | 2/2011 | Hommura | .......... | C08F 214/182 |
| | | | | 429/483 |
| 2015/0030962 A1* | 1/2015 | Hommura | .......... | H01M 8/1023 |
| | | | | 429/483 |

FOREIGN PATENT DOCUMENTS

| | | |
|---|---|---|
| JP | 2008-202039 | 9/2008 |
| JP | 2010-146965 | 7/2010 |
| JP | 2011-34769 | 2/2011 |
| WO | WO 2007/013533 A1 | 2/2007 |
| WO | WO 2011/013578 A1 | 2/2011 |
| WO | WO 2013/157395 A1 | 10/2013 |

\* cited by examiner

METHOD FOR PRODUCING LIQUID COMPOSITION, METHOD FOR PRODUCING COATING LIQUID FOR FORMING CATALYST LAYER, AND METHOD FOR PRODUCING MEMBRANE ELECTRODE ASSEMBLY

This application is a continuation of PCT Application No. PCT/JP2016/072679, filed on Aug. 2, 2016, which is based upon and claims the benefit of priority from Japanese Patent Application No. 2015-163726 filed on Aug. 21, 2015. The contents of those applications are incorporated herein by reference in their entireties.

TECHNICAL FIELD

The present invention relates to a method for producing a liquid composition, a method for producing a coating liquid for forming a catalyst layer, and a method for producing a membrane electrode assembly.

BACKGROUND ART

A solid polymer electrolyte fuel cell is, for example, one wherein a membrane electrode assembly is sandwiched between two separators to form a cell, and a plurality of such cells are stacked. The membrane electrode assembly is one comprising an anode and a cathode each having a catalyst layer, and a solid polymer electrolyte membrane disposed between the anode and the cathode.

The solid polymer electrolyte membrane in the membrane electrode assembly is formed, for example, by applying a liquid composition comprising a polymer having an ion exchange group, water and an organic solvent, followed by drying. Further, the catalyst layer in the membrane electrode assembly is formed, for example, by applying a coating liquid for forming a catalyst layer, having the liquid composition and a catalyst mixed, followed by drying (Patent Documents 1 and 2).

PRIOR ART DOCUMENTS

Patent Documents

Patent Document 1: JP-A-8-236122
Patent Document 2: JP-A-2010-146965

DISCLOSURE OF INVENTION

Technical Problem

However, the catalyst layer or the solid polymer electrolyte membrane containing a polymer having an ion exchange group has such a problem that it is susceptible to cracking at the time when the coating liquid for forming the catalyst layer or the liquid composition is applied and then dried. Particularly in a case where the polymer having an ion exchange group is a polymer (x) having a structural unit having a ring structure and a structural unit having an ion exchange group, cracking is likely to occur at the time of forming the catalyst layer or the solid polymer electrolyte membrane. Further, even in the case of having no structural unit having a ring structure, in the case of a polymer (y) having a structural unit having two ion-exchange groups in a pendant group, or a structural unit having one ion exchange group in a short chain pendant group represented by the formula (u3) as described later, cracking is likely to occur at the time of forming the catalyst layer or the solid polymer electrolyte membrane.

In order to make cracking less likely to occur at the time of forming the catalyst layer or the solid polymer electrolyte membrane, it is conceivable to increase the viscosity of the coating liquid for forming the catalyst layer, or the liquid composition. And, in order to increase the viscosity of the coating liquid for forming the catalyst layer, or the liquid composition, it is conceivable to increase the concentration of the polymer having an ion exchange group in the coating liquid for forming the catalyst layer, or the liquid composition.

However, if the concentration of the polymer (x) or the polymer (y) in the coating liquid for forming the catalyst layer, or the liquid composition, is made to be too high, the coating liquid for forming the catalyst layer, or the liquid composition, tends to be gelled, and it becomes difficult to form a uniform catalyst layer or solid polymer electrolyte. Therefore, there is a limitation for increasing the concentration of the polymer (x) or the polymer (y) in the coating liquid for forming the catalyst layer, or the liquid composition, in order to bring the viscosity of the coating liquid for forming the catalyst layer, or the liquid composition, to be sufficiently high.

In Patent Document 1, in order to increase the viscosity of the coating liquid for forming the catalyst layer, it is proposed to use, as a dispersion medium, a mixed medium of a hydrocarbon-type alcohol and a fluorinated solvent. However, even in the coating liquid for forming the catalyst layer in Patent Document 1, the viscosity is not sufficiently high, and cracking is likely to occur at the time of forming the catalyst layer.

In Patent Document 2, in order to form a catalyst layer less susceptible to flooding, it is proposed to incorporate a fluorinated solvent to the dispersion medium for the coating liquid for forming the catalyst layer. However, in the coating liquid for forming the catalyst layer in Patent Document 2, the polymer having an ion exchange group is a polymer with its viscosity hardly increasable, and its concentration is low, whereby the viscosity is not high, and cracking is likely to occur at the time of forming a catalyst layer.

The present invention is to provide a method capable of producing a liquid composition which can make cracking less likely to occur at the time of forming a solid polymer electrolyte membrane; a method capable of producing a coating liquid for forming a catalyst layer, which can make cracking less likely to occur at the time of forming a catalyst layer; and a method for producing a membrane electrode assembly, which can make cracking less likely to occur at the time of forming a catalyst layer or a solid polymer electrolyte membrane.

Solution to Problem

The present invention has the following embodiments.
[1] A method for producing a liquid composition, which comprises dispersing a polymer (x) having a structural unit having a ring structure and a structural unit having an ion exchange group, or a polymer (y) (excluding the polymer (x)) having either one or both of a structural unit having two ion exchange groups in a pendant group and a structural unit represented by the following formula (u22), in a medium containing water and a hydrocarbon-type alcohol (but not including a fluorinated solvent), to prepare a dispersion wherein the concentration of the polymer (x) or the polymer (y) is from 10 to 26 mass %, and mixing the dispersion and a fluorinated solvent so that the sum of the concentration of the polymer (x) or the polymer (y) and the concentration of the fluorinated solvent becomes to be from 12 to 35 mass %, to prepare a liquid composition:

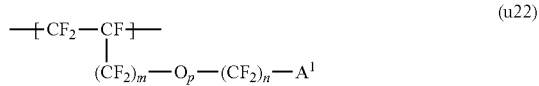
(u22)

wherein m is 0 or 1, provided that when p is 0, m is 0, p is 0 or 1, n is an integer of from 1 to 12, and $A^1$ is an ion exchange group.

[2] The method for producing a liquid composition according to [1], wherein the ion exchange group is a sulfonic acid group.

[3] The method for producing a liquid composition according to [1], wherein the structural unit having a ring structure is at least one member selected from the group consisting of the following units (u11) to (u14):

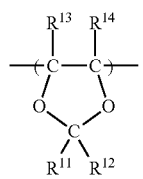
(u11)

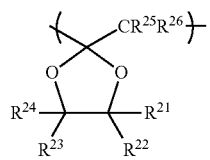
(u12)

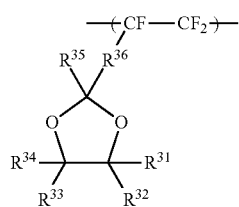
(u13)

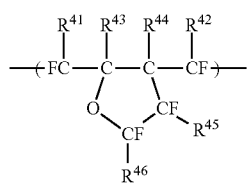
(u14)

wherein $R^{11}$ and $R^{12}$ are each independently a fluorine atom or a $C_{1-5}$ perfluoroalkyl group, $R^{13}$ and $R^{14}$ are each independently a fluorine atom, a $C_{1-5}$ perfluoroalkyl group or a $C_{1-5}$ perfluoroalkoxy group, $R^{21}$ to $R^{26}$ are each independently a monovalent perfluoro organic group which may have an etheric oxygen atom, or a fluorine atom, $R^{31}$ to $R^{35}$ are each independently a fluorine atom, a $C_{1-6}$ perfluoroalkyl group or a $C_{2-6}$ perfluoroalkyl group having an etheric oxygen atom between carbon-carbon atoms, $R^{36}$ is a single bond, a $C_{1-6}$ perfluoroalkylene group or a $C_{2-6}$ perfluoroalkylene group having an etheric oxygen atom between carbon-carbon atoms, and $R^{41}$ to $R^{46}$ are each independently a monovalent perfluoro organic group which may have an etheric oxygen atom, or a fluorine atom.

[4] The method for producing a liquid composition according to [1] or [2], wherein the structural unit having an ion exchange group is at least one member selected from the group consisting of the following units (u21) to (u23):

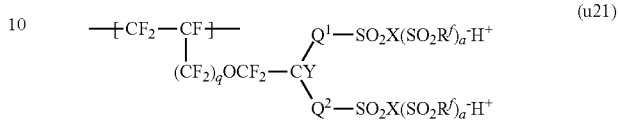
(u21)

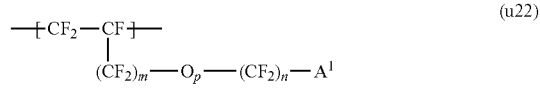
(u22)

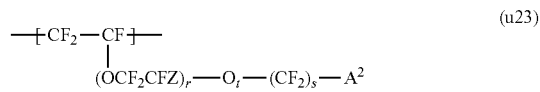
(u23)

wherein $Q^1$ is a perfluoroalkylene group which may have an etheric oxygen atom, $Q^2$ is a single bond or a perfluoroalkylene group which may have an etheric oxygen atom, Y is a fluorine atom or a monovalent perfluoro organic group, $R^f$ is a linear or branched perfluoroalkyl group which may have an etheric oxygen atom, X is an oxygen atom, a nitrogen atom or a carbon atom, provided that when X is an oxygen atom, a=0, when X is a nitrogen atom, a=1, and when X is a carbon atom, a=2, and q is 0 or 1; m is 0 or 1, provided when p is 0, m is 0, p is 0 or 1, n is an integer of from 1 to 12, and $A^1$ is an ion exchange group; Z is a fluorine atom or a trifluoromethyl group, r is an integer of from 1 to 3, t is 0 or 1, s is an integer of from 1 to 12, and $A^2$ is an ion exchange group.

[5] The method for producing a liquid composition according to [1] or [2], wherein the structural unit having two ion exchange groups in a pendant group is a structural unit represented by the following formula (u21):

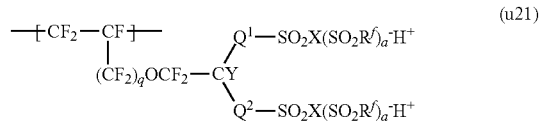
(u21)

wherein q is 0 or 1, Y is a fluorine atom or a monovalent perfluoro organic group, $Q^1$ is a perfluoroalkylene group which may have an etheric oxygen atom, $Q^2$ is a single bond or a perfluoroalkylene group which may have an etheric oxygen atom, $R^f$ is a perfluoroalkyl group which may have an etheric oxygen atom, X is an oxygen atom, a nitrogen atom or a carbon atom, provided that when X is an oxygen atom, a=0, when X is a nitrogen atom, a=1, and when X is a carbon atom, a=2.

[6] The method for producing a liquid composition according to any one of [1] to [3], wherein the structural unit having a ring structure is a structural unit represented by the following formula (u11):

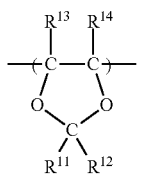

(u11)

wherein $R^{11}$ and $R^{12}$ are each independently a fluorine atom or a $C_{1-5}$ perfluoroalkyl group, and $R^{13}$ and $R^{14}$ are each independently a fluorine atom, a $C_{1-5}$ perfluoroalkyl group or a $C_{1-5}$ perfluoroalkoxy group.

[7] The method for producing a liquid composition according to any one of [1] to [6], wherein the fluorinated solvent is at least one solvent selected from the group consisting of hydrofluoroethers and hydrofluorocarbons.

[8] The method for producing a liquid composition according to any one of [1] to [7], wherein the hydrocarbon-type alcohol is at least one $C_{1-4}$ hydrocarbon-type alcohol.

[9] The method for producing a liquid composition according to [8], wherein the hydrocarbon-type alcohol is either one or both of ethanol and 1-propanol.

[10] A method for producing a coating liquid for forming a catalyst layer, which comprises preparing a liquid composition by the method for producing a liquid composition as defined in any one of [1] to [9], and mixing the liquid composition and a catalyst to prepare a coating liquid for forming a catalyst layer.

[11] A method for producing a membrane electrode assembly for a solid polymer fuel cell comprising an anode having a catalyst layer, a cathode having a catalyst layer and a solid polymer electrolyte membrane disposed between the anode and the cathode, which comprises preparing a coating liquid for forming a catalyst layer by the method for producing a coating liquid for forming a catalyst layer as defined in [10], and forming, by using the coating liquid, either one or both of the catalyst layers of the cathode and the anode.

[12] A method for producing a membrane electrode assembly for a solid polymer fuel cell comprising an anode having a catalyst layer, a cathode having a catalyst layer and a solid polymer electrolyte membrane disposed between the anode and the cathode, which comprises preparing a liquid composition by the method for producing a liquid composition as defined in any one of [1] to [9], and preparing the solid polymer electrolyte membrane by using the liquid composition.

Advantageous Effects of Invention

According to the method for producing a liquid composition of the present invention, it is possible to produce a liquid composition which can make cracking less likely to occur at the time of forming a solid polymer electrolyte membrane. According to the method for producing a coating liquid for forming a catalyst layer of the present invention, it is possible to produce a coating liquid for forming a catalyst layer which can make cracking less likely to occur at the time of forming the catalyst layer. According to the method for producing a membrane electrode assembly of the present invention, it is possible to make cracking less likely to occur at the time of forming the catalyst layer or the solid polymer electrolyte membrane.

DESCRIPTION OF EMBODIMENTS

Figure 1:
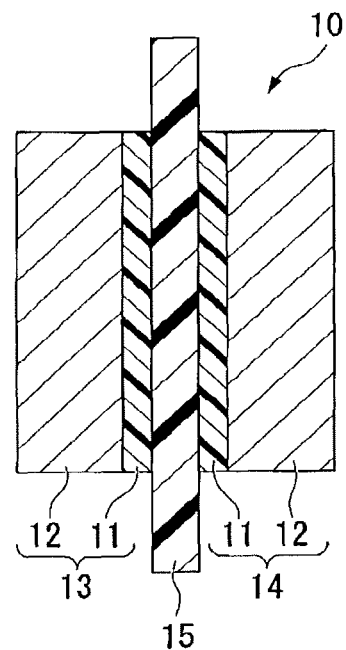
FIG. 1 is a schematic cross-sectional view showing an example of a membrane electrode assembly.

The following definitions of terms and manners for description will apply to the present specification including claims.

A structural unit represented by the formula (u11) will be referred to as a unit (u11). Structural units represented by other formulae will be referred to in the same manner.

A compound represented by the formula (m11) will be referred to as a compound (m11). Compounds represented by other formulae will be referred to in the same manner.

A group represented by the formula (g1) will be referred to as a group (g1). Groups represented by other formulae will be referred to in the same manner.

A "structural unit" means a unit derived from a monomer, which is formed by polymerization of the monomer. A structural unit may be a unit formed directly by a polymerization reaction of a monomer, or may be a unit having a part of such a unit converted to another structure by treatment of the polymer.

An "ion exchange group" means a group having $H^+$, a monovalent metal cation, an ammonium ion, etc. The ion exchange group may, for example, be a sulfonic acid group, a sulfonimide group, a sulfone methide group, a carboxylic acid group, etc.

A "sulfonic acid group" includes $—SO_3^-H^+$ and $—SO_3^-M^+$ (wherein $M^+$ is a monovalent metal ion or an ammonium ion wherein at least one hydrogen atom may be substituted by a hydrocarbon group).

A "precursor group" means a group that can be converted to an ion-exchange group by known treatment such as hydrolysis treatment, acid-form treatment, etc. The precursor group may, for example, be a $—SO_2F$ group, etc.

The "viscosity of a liquid composition" is a viscosity measured under conditions of a temperature of 25° C. and a shear rate of 10 $s^{-1}$.

<Liquid Composition>

The liquid composition obtainable by the production method of the present invention is one comprising a specific polymer (x) or polymer (y) as described later, and a specific dispersion medium as described later, and one having the specific polymer (x) or polymer (y) dispersed in the specific dispersion medium. The liquid composition may contain components other than the polymer (x), polymer (y) and dispersion medium, as the case requires, within a range not to impair the effects of the present invention.

(Viscosity of Liquid Composition)

The viscosity of the liquid composition is preferably from 1,000 to 500,000 mPa·s, more preferably from 5,000 to 100,000 mPa·s, further preferably from 10,000 to 50,000 mPa·s. When the viscosity of the liquid composition is at least the lower limit value in the above range, cracking is less likely to occur at the time of forming a catalyst layer or a solid polymer electrolyte membrane. When the viscosity of the liquid composition is at most the upper limit value in the above range, it will be easy to apply the liquid composition.

(Polymer (x))

The polymer (x) is a polymer having a structural unit having a ring structure (hereinafter referred to also as the structural unit (A)) and a structural unit having an ion exchange group (hereinafter referred to also as the structural unit (B)). The polymer (x) may have a structural unit derived from a monomer having no ion-exchange group and no ring structure (hereinafter referred to also as the structural unit (C)), within a range not to impair the effect of the present invention.

Structural Unit (A):

The structural unit (A) may, for example, be a structural unit derived from a perfluoro monomer having a 5-membered ring, as described later (hereinafter referred to also as a monomer (a1)) or a perfluoro monomer capable of forming a 5-membered ring by cyclization polymerization as described later (hereinafter referred to also as a monomer (a2)) (hereinafter, the monomer (a1) and the monomer (a2) may be collectively referred to also as a monomer (a)).

The 5-membered ring is a cyclic perfluoro organic group which may have one or two etheric oxygen atoms.

As the structural unit derived from a monomer (a1), for example, units (u11) to (u13) may be mentioned, and from such a viewpoint that the effect to further improve the electrode performance of the polymer (x) is high, the unit (u11) or the unit (u12) is preferred.

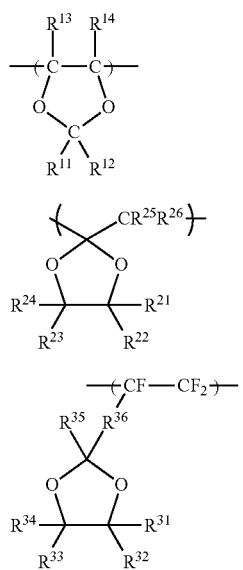

$R^{11}$ and $R^{12}$ are each independently a fluorine atom or a $C_{1-5}$ perfluoroalkyl group.

$R^{13}$ and $R^{14}$ are each independently a fluorine atom, a $C_{1-5}$ perfluoroalkyl group or a $C_{1-5}$ perfluoroalkoxy group. Of $R^{13}$ and $R^{14}$, from the viewpoint of high polymerization reactivity, at least one is preferably a fluorine atom, and more preferably, both are fluorine atoms.

The perfluoroalkyl group and the perfluoroalkoxy group may be linear or branched, and are preferably linear.

$R^{21}$ to $R^{26}$ are each independently a monovalent perfluoro organic group which may have an etheric oxygen atom, or a fluorine atom. As the monovalent perfluoro organic group, a perfluoroalkyl group is preferred. In a case where the perfluoroalkyl group has an etheric oxygen atom, the number of such an oxygen atom may be one or may be two or more. Further, such an oxygen atom may be inserted between carbon-carbon atoms in the perfluoroalkyl group, or may be inserted at a terminal of a carbon atom bond. The perfluoroalkyl group may be linear or branched and is preferably linear.

Of $R^{25}$ and $R^{26}$, from the viewpoint of high polymerization reactivity, at least one is preferably a fluorine atom, and more preferably, both are fluorine atoms.

$R^{31}$ to $R^{35}$ are each independently a fluorine atom, a $C_{1-6}$ perfluoroalkyl group or a $C_{2-6}$ perfluoroalkyl group having an etheric oxygen atom between carbon-carbon atoms. In a case where the perfluoroalkyl group has an etheric oxygen atom, the number of such an oxygen atom may be one or may be two or more. The perfluoroalkyl group may be linear or branched and is preferably linear.

$R^{36}$ is a single bond, a $C_{1-6}$ perfluoroalkylene group or a $C_{2-6}$ perfluoroalkylene group having an etheric oxygen atom between carbon-carbon atoms. In a case where the perfluoroalkylene group has an etheric oxygen atom, the number of such an oxygen atom may be one or may be two or more. The perfluoroalkylene group may be linear or branched and is preferably linear.

As the unit (u11), the unit (u11-1) is particularly preferred from such a viewpoint that the effect to further improve the electrode performance of the polymer (x) is high.

As the unit (u12), the unit (u12-1) is particularly preferred from the viewpoint of easiness in the synthesis of the monomer.

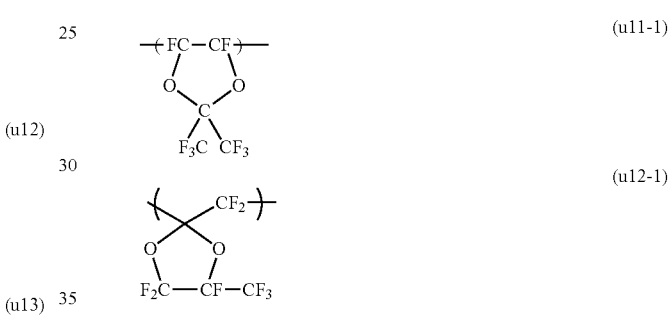

As the structural unit derived from a monomer (a2), for example, a unit (u14) may be mentioned.

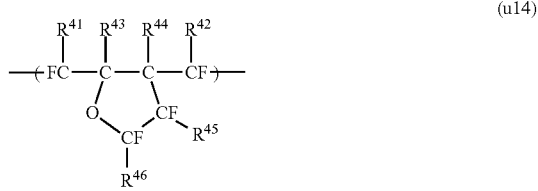

$R^{41}$ to $R^{46}$ are each independently a monovalent perfluoro organic group which may have an etheric oxygen atom, or a fluorine atom. As the monovalent perfluoro organic group, a perfluoroalkyl group is preferred. In a case where the perfluoroalkyl group has an etheric oxygen atom, the number of such an oxygen atom may be one or may be two or more. Further, such an oxygen atom may be inserted between carbon-carbon atoms in the perfluoroalkyl group, or may be inserted at a terminal of a carbon atom bond. The perfluoroalkyl group may be linear or branched and is preferably linear.

$R^{41}$ to $R^{44}$ are, from the viewpoint of high polymerizability, more preferably fluorine atoms.

As the unit (u14), the unit (u14-1) is particularly preferred from the viewpoint of easiness in the synthesis of the monomer.

(u14-1)

Structural Unit (B):

The structural unit (B) may, for example, be a structural unit obtained by converting a precursor group in a structural unit (hereinafter referred to also as a structural unit (B')) derived from a monomer (hereinafter referred to also as a monomer (b)) having the precursor group for an ion exchange group as described later, to the ion exchange group.

The structural unit (B) may be a structural unit (hereinafter referred to also as a structural unit (B1)) having two ion exchange groups in a pendant group, or a structural unit (hereinafter referred to also as a structural unit (B2) having one ion exchange group in a pendant group.

Structural Unit (B1):

The structural unit (B1) may be a structural unit obtained by converting a precursor group in a structural unit derived from a perfluoro monomer (hereinafter referred to also as a monomer (b1)) having a group (g'1) which is the precursor group for an ion exchange group as described later, to the ion exchange group.

The ion exchange group is preferably a group (g1).

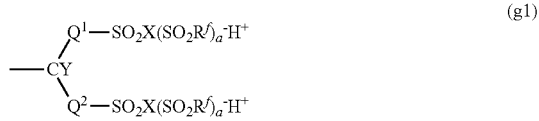

(g1)

$Q^1$ is a perfluoroalkylene group which may have an etheric oxygen atom.

$Q^2$ is a single bond, or a perfluoroalkylene group which may have an etheric oxygen atom.

In a case where the perfluoroalkylene group for $Q^1$ or $Q^2$ has an etheric oxygen atom, the number of such an oxygen atom may be one or may be two or more. Further, such an oxygen atom may be inserted between carbon-carbon atoms in the perfluoroalkylene group, or may be inserted at a terminal of a carbon atom bond.

The perfluoroalkylene group may be linear or branched and is preferably linear.

The number of carbon atoms in the perfluoroalkylene group is preferably from 1 to 6, more preferably from 1 to 4. When the number of carbon atoms is at most 6, the boiling point of the raw material monomer becomes low, whereby the distillation purification will be facilitated. Further, when the number of carbon atoms is at most 6, lowering of the ion exchange capacity of the polymer (x) can be suppressed, whereby decrease in the proton conductivity can be suppressed.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, as compared to the case where $Q^2$ is a single bond, the stability of the power generation performance will be excellent at the time of driving the solid polymer electrolyte fuel cell for a long period of time.

At least one of $Q^1$ and $Q^2$ is preferably a $C_{1-6}$ perfluoroalkylene group having an etheric oxygen atom. A monomer having a $C_{1-6}$ perfluoroalkylene group having an etheric oxygen atom, can be synthesized without via a fluorination reaction by fluorine gas, whereby the yield will be good, and the production will be easy.

Y is a fluorine atom or a monovalent perfluoro organic group.

Y is preferably a fluorine atom or a $C_{1-6}$ linear perfluoroalkyl group which may have an etheric oxygen atom.

$R^f$ is a linear or branched perfluoroalkyl group which may have an etheric oxygen atom. The number of carbon atoms in the perfluoroalkyl group is preferably from 1 to 8, more preferably from 1 to 6. In a case where the group (g1) has two or more $R^f$, the plurality of $R^f$ may be the same groups or may be different groups, respectively.

X is an oxygen atom, a nitrogen atom or a carbon atom, and in a case where X is an oxygen atom, a=0, in a case where X is a nitrogen atom, a=1, and in a case where X is a carbon atom, a=2.

The group (g1) may, for example, be a sulfonic acid group ($-SO_3^-H^+$ group), a sulfonimide group ($-SO_2N(SO_2R^f)^-H^+$ group), or a sulfonmethide group ($-SO_2C(SO_2R^f)_2)^-H^+$ group).

As the structural unit (B1), the unit (u21) is preferred, since it is possible to suppress the water content to be low even if the conductivity of the polymer (x) is increased, and since it is possible to express a much higher power generation performance even under low or no humidity conditions, or high humidity conditions.

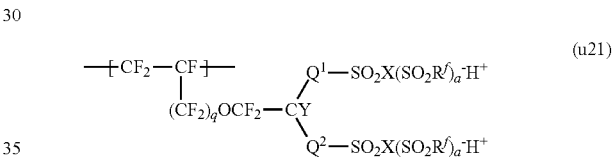

(u21)

q is 0 or 1.

$Q^1$, $Q^2$, Y, $R^f$, X and a are as described in the group (g1).

As the unit (u21), from such a viewpoint that the production of the polymer (x) is easy, and industrial operation is easy, units (u21-1) to (u21-3) are preferred, and the unit (u21-1) is particularly preferred.

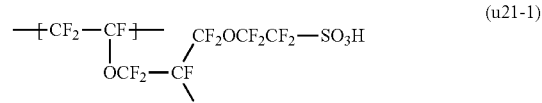

(u21-1)

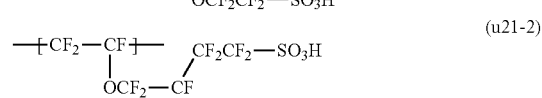

(u21-2)

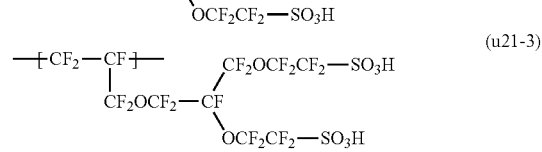

(u21-3)

Structural Unit (B2):

The structural unit (B2) may, for example, be a unit (u22) obtained by converting a precursor group in a structural unit derived from a compound (m22) as described later, to an ion exchange group, or a unit (u23) obtained by converting a precursor in a structural unit derived from a compound (m23) as described later, to an ion exchange group.

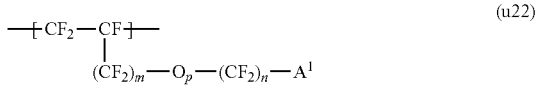

(u22)

Here, m is 0 or 1, provided when p is 0, m is 0, p is 0 or 1, n is an integer of from 1 to 12, and $A^1$ is an ion exchange group.

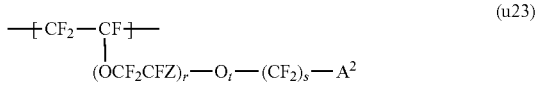

(u23)

Here, Z is a fluorine atom or a trifluoromethyl group, r is an integer of from 1 to 3, t is 0 or 1, s is an integer of from 1 to 12, and $A^2$ is an ion exchange group.

As the unit (u22), units (u22-1) to (u22-2) are preferred.

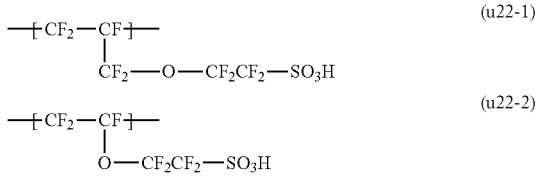

As the unit (u23), a unit (u23-1) is preferred.

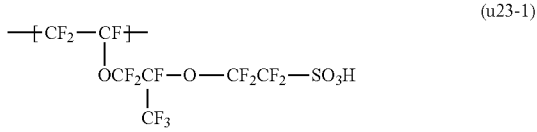

Structural Unit (C):

The structural unit (C) is a structural unit derived from a monomer (hereinafter referred to also as a monomer (c)) having no ion-exchange group and no ring structure as described later.

As the structural unit (C), from such a viewpoint that the water content of the polymer (x) can be reduced, a structural unit derived from tetrafluoroethylene (hereinafter referred to also as TFE) is particularly preferred.

Ion Exchange Capacity of Polymer (x):

The ion exchange capacity of the polymer (x) is preferably from 0.6 to 2.3 meq/g dry resin, more preferably from 0.9 to 2.0 meq/g dry resin. When the ion exchange capacity is at least the lower limit value in the above range, the conductivity of the polymer (x) will be high, whereby it is possible to obtain a sufficient cell output when used in a catalyst layer of a solid polymer electrolyte fuel cell. When the ion exchange capacity is at most the upper limit value in the above range, the production of the polymer (x) will be easy.

Production of Polymer (x):

The polymer (x) is produced by converting a precursor group for an ion exchange group, of a polymer (x') having such a precursor group, to the ion exchange group.

The method for converting the precursor group to the ion exchange group may, for example, be a method described in WO2011/013578. For example, as a method of converting a —$SO_2F$ group to a sulfonic acid group (—$SO_3^-H^+$ group), a method may be mentioned wherein a —$SO_2F$ group of the polymer (x') is hydrolyzed to a sulfonate, and the sulfonate is converted to a sulfonic acid group.

Polymer (x'):

The polymer (x') is a polymer having a structural unit (A) having a ring structure, a structural unit (B') having a precursor group for an ion exchange group, and, as the case requires, a structural unit (C).

The polymer (x') is produced by polymerizing a monomer (a), a monomer (b) and, as the case requires, a monomer (c).

The polymerization method may, for example, be a method described in WO2011/013578.

Structural Unit (A):

The structural unit (A) may, for example, be a structural unit derived from a monomer (a1) having a 5-membered ring, or from a monomer (a2) capable of forming a 5-membered ring by cyclization polymerization.

As the monomer (a1), for example, compounds (m11) to (m13) may be mentioned, and from such a viewpoint that the effect to further improve the electrode performance of the polymer (x) is high, the compound (m11) or the compound (m12) is preferred.

(m11)

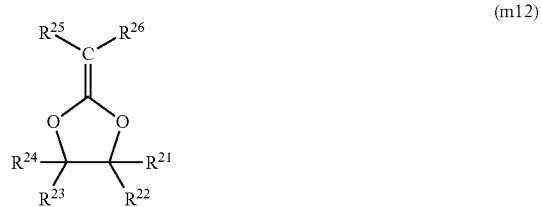

(m12)

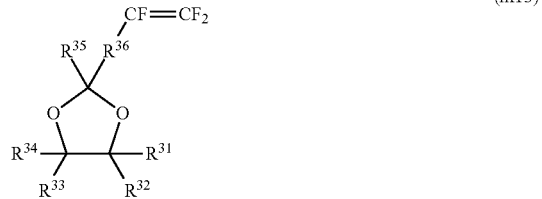

(m13)

$R^{11}$ to $R^{14}$ are as described in the unit (u11). Of $R^{13}$ and $R^{14}$, from such a viewpoint that the polymerization reactivity is high, at least one is preferably a fluorine atom, and more preferably, both are fluorine atoms.

$R^{21}$ to $R^{26}$ are as described in the unit (u12).

$R^{31}$ to $R^{36}$ are as described in the unit (u13).

As the compound (m11), for example, compounds (m11-1) to (m11-8) may be mentioned, and from such a viewpoint that the effect to further improve the electrode performance of the polymer (x) is high, the compound (m11-1) is particularly preferred.

(m11-1) 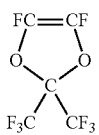

(m11-2) 

(m11-3) 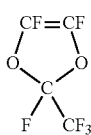

(m11-4) 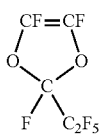

(m11-5) 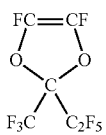

(m11-6) 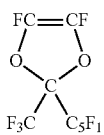

(m11-7) 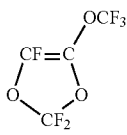

(m11-8) 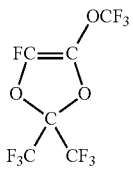

As the compound (m12), for example, compound (m12-1) or compound (m12-2) may be mentioned, and from such a viewpoint that the synthesis is easy and the polymerization reactivity is high, the compound (m12-1) is particularly preferred.

(m12-1) 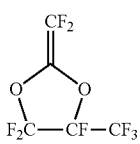

(m12-2) 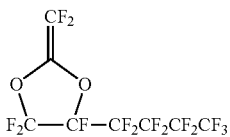

As the compound (m13), for example, compounds (m13-1) or compound (m13-2) may be mentioned.

(m13-1) 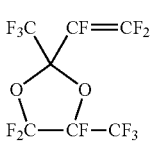

(m13-2) 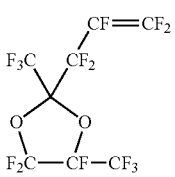

The compound (m11) can be synthesized by the method described in Macromolecule, vol. 26, No. 22, 1993, p. 5829-5834; JP-A-6-92957, etc.

The compound (m12) can be synthesized by the method described in WO2000/056694; Izvestiya Akademii Nauk SSSR, Seriya Khimicheskaya, 1989, vol. 4, p. 938-42, etc.

The compound (m13) can be synthesized by the method described in JP-A-2006-241302.

As the monomer (a2), for example, a compound (m14) may be mentioned.

(m14) 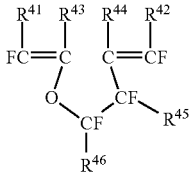

$R^{41}$ to $R^{46}$ are as described in the unit (u14).

As the compound (m14), for example, compounds (m14-1) to (m14-3) may be mentioned, and from the viewpoint of easiness in the synthesis of the monomer, the compound (m14-1) is particularly preferred.

$CF_2=CF-O-CF_2-CF_2-CF=CF_2$ (m14-1)

$CF_2=CF-O-CF_2-CF(CF_3)-CF=CF_2$ (m14-2)

$CF_2=CF-O-CF(CF_3)-CF_2-CF=CF_2$ (m14-3)

The compound (m14) can be synthesized by the method described in Macromol. Symp., vol. 98, 1995, p. 753-767, etc.

Structural Unit (B'):

The structural unit (B') may, for example, be a structural unit derived from a monomer (b) having a precursor group for an ion-exchange group.

As the structural unit (B'), a structural unit (hereinafter referred to also as a structural unit (B'1)) having a precursor group for two ion-exchange groups in a pendant group, or a structural unit (hereinafter referred to also as a structural unit (B'2)) having a precursor group for one ion-exchange group in a pendant group may be mentioned.

Structural Unit (B1):

The structural unit (B'1) may be a structural unit derived from a monomer (b1) having a group (g'1) which is a precursor group for ion-exchange groups.

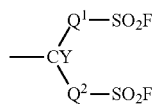
(g'1)

$Q^1$, $Q^2$ and Y are as described in the group (g1).

As the monomer (b1), a compound (m21) is preferred, since it is thereby possible to suppress the water content to be low even if the conductivity of the polymer (x) is increased, and it is possible to express a higher power generation performance even under low or no humidity conditions, or high humidity conditions.

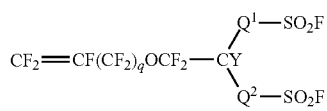
(m21)

q, $Q^1$, $Q^2$ and Y are as described in the unit (u21).

As the compound (m21), from such a viewpoint that the production of the polymer (x) will be easy, and industrial operation will be easy, compounds (m21-1) to (m21-3) are preferred, and the compound (m21-1) is particularly preferred.

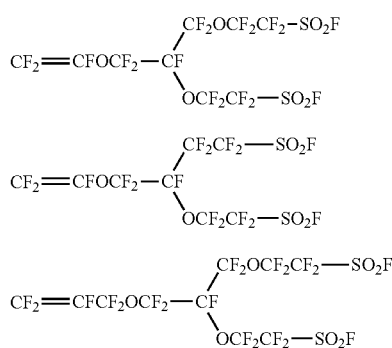
(m21-1)
(m21-2)
(m21-3)

The compound (m21) can be synthesized by the method described in WO2007/013533, JP-A-2008-202039, etc.

Structural Unit (B'2):

The structural unit (B'2) may be a structural unit derived from a compound (m22) or a structural unit derived from a compound (m23).

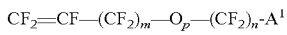
(m22)

(m23)

m, p, n and $A^1$ are as described in the unit (u22).
Z, r, t, s and $A^2$ are as described in the unit (u23).

As the compound (m22), a compound (m22-1) or (m22-2) is preferred.

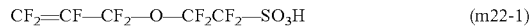
(m22-1)

(m22-2)

As the compound (m23), a compound (m23-1) is preferred.

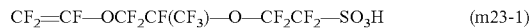
(m23-1)

Structural Unit (C):

The structural unit (C) is a structural unit derived from a monomer (c) having no ion exchange group and no ring structure.

The monomer (c) may, for example, be TFE, chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (such as hexafluoropropylene), a (perfluoroalkyl) ethylene (such as (perfluorobutyl) ethylene), a (perfluoroalkyl) propene (such as 3-perfluorooctyl-1-propene), a perfluoro(alkyl vinyl ether), etc. As the monomer (c), TFE is particularly preferred. TFE has high crystallinity, and thus has an effect to suppress swelling at the time when the polymer (x) is hydrated, and it is possible to reduce the water content of the polymer (x).

(Polymer (y))

The polymer (y) is a polymer (excluding the polymer (x)) having either one or both of a structural unit (B1) having two ion exchange groups in a pendant group, and a unit (u22) obtained by converting a precursor group in a structural unit derived from the compound (m22) to an ion-exchange group. The polymer (y) may have a structural unit (C) derived from a monomer (c) having no ion exchange group and no ring structure, within a range not to impair the effects of the present invention.

With respect to the structural unit (B1), the unit (u22) and the structural unit (C) in the polymer (y), the same ones as the structural unit (B1), the unit (u22) and the structural unit (C) in the polymer (x) may be mentioned, and the preferred embodiments may also be the same.

Ion Exchange Capacity of Polymer (y):

The ion exchange capacity of the polymer (y) is preferably from 0.6 to 2.6 meq/g dry resin, more preferably from 0.9 to 2.3 meq/g dry resin. When the ion exchange capacity is at least the lower limit value in the above range, the conductivity of the polymer (y) will be high, whereby when used in a catalyst layer of a polymer electrolyte fuel cell, it will be possible to obtain a sufficient cell output. When the ion exchange capacity is at most the upper limit value in the above range, the production of the polymer (y) will be easy.

Production of Polymer (y):

The polymer (y) is produced by converting a precursor group for an ion exchange group in a polymer (y') having such a precursor group, to the ion exchange group.

The polymer (y') is a polymer having either one or both of a structural unit (B'1) having a precursor group for two ion exchange groups in a pendant group and a structural unit derived from the compound (m22), and, as the case requires, a structural unit (C).

The polymer (y') is produced by polymerizing either one or both of the monomer (b1) and the compound (m22), and, as the case requires, the monomer (c).

(Dispersion Medium)

The dispersion medium comprises water, a hydrocarbon-type alcohol and a fluorinated solvent. The dispersion medium may contain a solvent other than water, a hydrocarbon-type alcohol and a fluorinated solvent, within a range not to impair the effects of the present invention.

The water will improve the dispersibility of the polymer (x) or polymer (y) to the dispersion medium.

The hydrocarbon-type alcohol will improve the dispersibility of the polymer (x) or polymer (y) to the dispersion medium and will make cracking less likely to occur at the time of forming a catalyst layer or a solid polymer electrolyte membrane.

The fluorinated solvent will, by being combined with the water and the hydrocarbon-type alcohol, sufficiently thicken the liquid composition and will make cracking further less likely to occur at the time of forming a catalyst layer or a solid polymer electrolyte membrane.

As the hydrocarbon-type alcohol, at least one type of a $C_{1-4}$ alcohol is preferred from such a viewpoint that the dispersibility of the polymer will be good, and it will be easy to prepare a dispersion.

The $C_{1-4}$ alcohol may be methanol, ethanol, 1-propanol, 2-propanol, 1-butanol, 2-butanol, 2-methyl-1-propanol, 2-methyl-2-propanol, etc. Particularly, either one or both of ethanol and 1-propanol are preferred from such a viewpoint that the dispersibility of the polymer will be good, it will be easy to prepare a dispersion, and at the time of forming a solid polymer electrolyte membrane or a catalyst layer, the boiling point will be low, and it will be easy to remove the alcohol.

The fluorinated solvent may, for example, be a hydrofluoroether, a hydrofluorocarbon, a hydrochlorofluorocarbon, a chlorofluorocarbon, a fluorinated alcohol, etc., and from such a viewpoint that cracking is less likely to occur at the time of forming a catalyst layer or a solid polymer electrolyte membrane, at least one member selected from the group consisting of a hydrofluoroether and a hydrofluorocarbon, is preferred.

The hydrofluoroether may, for example, be 1,1,2,2-tetrafluoroethyl-2,2,2-trifluoroethyl ether, methyl-1,1,1,2,3,3-hexafluoropropyl ether, methyl-nano-fluorobutyl ether, methyl-nano-fluoroisobutyl ether, ethyl-nano-fluorobutyl ether, ethyl-nano-fluoroisobutyl ether, 4-methyl-1,1,1,2,3,3-hexafluorobutyl-1,1,2,3,3,3-hexafluoropropyl ether, etc. As the hydrofluoroether, 1,1,2,2-tetrafluoroethyl-2,2,2-trifluoroethyl ether is preferred, from such a viewpoint that the effect to increase the viscosity of the dispersion will be particularly high.

The hydrofluorocarbon may, for example, be 1,1,2,2,3,3,4-heptafluorocyclopentane, 1,1,1,2,3,3-hexafluoropropane, 1,1,2,2,3,3,4,4-octafluorobutane, 1,1,1,2,3,4,4,5,5,5-decafluoropentane, 1,1,1,2,3,4,5,5,5-nonafluoro-2-(trifluoromethyl)-pentane, 1,1,1,2,3,3,4,4,5,6,6,6-dodecafluorohexane, 1,1,1,2,3,4,4,5,5,5-decafluoro-2-(trifluoromethyl)-pentane, 1,2,3,3,4,4-hexafluoro-1,2-di(trifluoromethyl)-cyclobutane, 1,1,1,2,2-pentafluorobutane, 1,1,1,2,2,3,3,4,4,5,5,6,6-tridecafluoro-hexane, 1,1,1,2,2,3,3,4,4,5,5,6,6,8,8,8-hexadecafluoro-octane, etc. As the hydrofluorocarbon, 1,1,2,2,3,3,4-heptafluorocyclopentane is preferred from such a viewpoint that the effect to increase the viscosity of the dispersion will be particularly high.

The proportion of water in the dispersion medium (100 mass %), is preferably from 3 to 95 mass %, more preferably from 10 to 80 mass %. When the proportion of water is at least the lower limit value in the above range, the dispersibility of the polymer (x) or polymer (y) to the dispersion medium will be excellent. When the proportion of water is at most the upper limit value in the above range, the effects due to the hydrocarbon-type alcohol and the fluorinated solvent will be sufficiently exhibited.

The proportion of the hydrocarbon-type alcohol in the dispersion medium (100 mass %) is preferably from 2 to 94 mass %, more preferably from 15 to 85 mass %. When the proportion of the hydrocarbon-type alcohol is at least the lower limit value in the above range, the dispersibility of the polymer (x) or polymer (y) to the dispersion medium will be excellent, and cracking will be less likely to occur at the time of forming a catalyst layer or a solid polymer electrolyte membrane. When the proportion of the hydrocarbon-type alcohol is at most the upper limit value in the above range, the effects due to the water and the fluorinated solvent will be sufficiently exhibited.

The proportion of the fluorinated solvent in the dispersion medium (100 mass %) is preferably from 1 to 30 mass %, more preferably from 5 to 25 mass %. When the proportion of the fluorinated solvent is at least the lower limit value in the above range, cracking will be further less likely to occur at the time of forming a catalyst layer or a solid polymer electrolyte membrane. When the proportion of the fluorinated solvent is at most the upper limit value in the above range, the effects due to the water and the hydrocarbon-type alcohol will be sufficiently exhibited.

(Composition of Liquid Composition)

The concentration of the polymer (x) or polymer (y) in the liquid composition (100 mass %) is preferably from 7.2 to 25.7 mass %, more preferably from 10 to 20 mass %. When the concentration of the polymer (x) or polymer (y) is at least the lower limit value in the above range, it is easy to increase the viscosity of the liquid composition. When the concentration of the polymer (x) or polymer (y) is at most the upper limit value in the above range, the viscosity of the liquid composition is less likely to be too high, and it is easy to form a uniform catalyst layer or solid polymer electrolyte.

(Use of Liquid Composition)

The liquid composition is suitably used for forming a catalyst layer or solid polymer electrolyte membrane in a membrane electrode assembly. Further, it is useful for forming other membranes (such as proton permselective membranes to be used for water electrolysis, hydrogen peroxide production, ozone production, spent acid recovery, etc., cation exchange membranes for sodium chloride electrolysis, diaphragms for redox flow batteries, cation exchange membranes for electrodialysis to be used for desalination or salt production, etc.).

<Method for Producing Liquid Composition>

The method for producing a liquid composition of the present invention is a method having the following step ($\alpha$) and step ($\beta$).

Step ($\alpha$): The polymer (x) or polymer (y) is dispersed in a medium containing water and a hydrocarbon-type alcohol (not including a fluorinated solvent) to prepare a dispersion wherein the concentration of the polymer (x) or polymer (y) is from 10 to 26 mass %.

Step ($\beta$): After the step ($\alpha$), the dispersion and a fluorinated solvent are mixed so that the sum of the concentration of the polymer (x) or polymer (y) and the concentration of the fluorinated solvent becomes to be from 12 to 35 mass %.

(Step ($\alpha$))

The dispersion can be prepared by mixing and stirring the polymer (x) or polymer (y) and the medium (water and a hydrocarbon-type alcohol). The medium may contain other solvents other than a hydrocarbon-type alcohol and a fluorinated solvent, within a range not to impair the effects of the present invention. Further, the dispersion may contain components other than the polymer (x) or polymer (y) and the medium, within a range not to impair the effects of the present invention.

With respect to the method for preparing the dispersion, there have been several reports. The dispersion may be prepared, for example, in accordance with the preparation methods described in JP-B-4-35226, JP-A-2001-504872, JP-A-2005-82749, WO2006/38928, JP-A-2004-519296, etc.

As a specific method for the preparation of the dispersion, a method of exerting shearing such as stirring to the polymer (x) or polymer (y) in the medium under atmospheric pressure or under a closed state in an autoclave or the like. If necessary, shearing by e.g. ultrasonic waves may be applied.

In the case of forming the dispersion by exerting shearing such as stirring to a mixed liquid having the polymer (x) or polymer (y) and the medium mixed, the shearing such as stirring may be exerted to a mixed liquid having the entire medium mixed all at once to the polymer (x) or polymer (y), or the medium may be mixed to the polymer (x) or polymer (y) dividedly in a plurality of times, so that the shearing such as stirring may be exerted in between. For example, the shearing such as stirring may be exerted to a mixed liquid having a part of the hydrocarbon-type alcohol and a part of the water added to the polymer (x) or polymer (y), and thereafter, the remaining medium may be added to the mixed liquid, followed by exerting shearing such as stirring again. Otherwise, only the hydrocarbon alcohol may be added to the polymer (x) or polymer (y), followed by exerting the shearing such as stirring, and thereafter, only the water may be added, followed by exerting the shearing such as stirring again.

The temperature during the preparation of the dispersion is preferably from 80 to 180° C., more preferably from 100 to 130° C. The time is preferably from 1 to 48 hours, more preferably from 2 to 24 hours.

The concentration of the polymer (x) or polymer (y) in the dispersion (100 mass %) is from 10 to 26 mass %, preferably from 12 to 24 mass %, more preferably from 15 to 23 mass %. When the concentration of the polymer (x) or polymer (y) is at least the lower limit value in the above range, the viscosity of the liquid composition can be easily made high in step (β). When the concentration of the polymer (x) or polymer (y) is at most the upper limit value in the above range, the viscosity of the liquid composition will not be too high in step (β), and it will be easy to form a uniform catalyst layer or solid polymer electrolyte.

The proportion of water in the total (100 mass %) of water and the hydrocarbon-type alcohol, is preferably from 3 to 98 mass %, more preferably from 11 to 84 mass %. When the proportion of water is at least the lower limit value in the above range, the dispersibility of the polymer (x) or polymer (y) to the medium will be excellent. When the proportion of water is at most the upper limit value in the above range, the effect due to the hydrocarbon-type alcohol will be sufficiently exhibited.

The proportion of the hydrocarbon-type alcohol in the total (100 mass %) of water and the hydrocarbon-type alcohol is preferably from 2 to 97 mass %, more preferably from 16 to 89 mass %. When the proportion of the hydrocarbon-type alcohol is at least the lower limit value in the above range, the dispersibility of the polymer (x) or polymer (y) to the medium will be excellent, and cracking will be further less likely to occur at the time of forming a catalyst layer or a solid polymer electrolyte membrane. When the proportion of the hydrocarbon-type alcohol is at most the upper limit value in the above range, the effect due to the water will be sufficiently exhibited.

(Step (β))

The liquid composition is prepared by mixing and stirring the dispersion and the fluorinated solvent. The dispersion medium in the liquid composition may contain other solvents other than water, a hydrocarbon-type alcohol and a fluorinated solvent, as the case requires, within a range not to impair the effects of the present invention. Further, the liquid composition may contain other components other than the polymer (x), the polymer (y) and the dispersion medium, as the case requires, within a range not to impair the effects of the present invention.

The stirring means may be a known stirring apparatus having stirring blades, or a known stirring apparatus using no stirring blades. The stirring blades may, for example, be blade vanes, anchor blades, ribbon blades, pitched paddles, pitched turbines, three propellers, a serrated disc turbine, portal wings, etc. As the stirring blades, one type may be used alone, or two or more types may be used in combination. As a stirring apparatus provided with stirring blades, which is suitable for stirring a high viscosity solution, specifically, a stirring apparatus of a biaxial planetary system may be mentioned wherein two blade vanes perform revolution and rotation movements simultaneously (manufactured by PRIM IX Corporation, HIVIS MIX). As a stirring apparatus capable of stirring a high viscosity solution without using stirring blades, a planetary centrifugal mixer performing stirring and mixing by a centrifugal force of rotation and revolution, may be mentioned.

The temperature of the mixed liquid during the stirring is preferably from 10 to 40° C., more preferably from 20 to 30° C. When the temperature of the mixed liquid is at least the lower limit value in the above range, the viscosity of the liquid composition can be easily made to be high in step (β). When the temperature of the mixed liquid is at most the upper limit value in the above range, the viscosity of the liquid composition in step (β) will not be too high, and it will be easy to form a uniform catalyst layer or solid polymer electrolyte.

The stirring time is preferably from 0.5 minute to 16 hours, more preferably from 1 minute to 2 hours. When the stirring time is at least the lower limit value in the above range, the viscosity of the liquid composition in step (β) can be easily made to be high. When the stirring time is at most the upper limit value in the above range, the production time for the liquid composition will not be too long.

The shear rate during the stirring is preferably from 1 to 1,000 $s^{-1}$, more preferably from 5 to 100 $s^{-1}$. When the shear rate is at least the lower limit value in the above range, the viscosity of the liquid composition in step (β) can be easily made to be high. When the shear rate is at most the upper limit value in the above range, the viscosity of the liquid composition will not be too high in step (β), and it will be easy to form a uniform catalyst layer or solid polymer electrolyte.

The sum of the concentration of the polymer (x) or polymer (y) and the concentration of the fluorinated solvent in the liquid composition (100 mass %) is from 12 to 35 mass %, preferably from 15 to 30 mass %, more preferably from 18 to 25 mass %. When the sum of the concentration of the polymer (x) or polymer (y) and the concentration of the fluorinated solvent is at least the lower limit value in the above range, the viscosity of the liquid composition will be sufficiently high in step (β). When the sum of the concentration of the polymer (x) or polymer (y) and the concentration of the fluorinated solvent is at most the upper limit value in the above range, the viscosity of the liquid composition will not be too high in step (β), and it will be easy to form a uniform catalyst layer or solid polymer electrolyte.

In the method for producing a liquid composition of the present invention as described above, the polymer (x) or polymer (y) is preliminarily dispersed in a medium containing water and a hydrocarbon-type alcohol (but not including a fluorinated solvent) to prepare a dispersion wherein the concentration of the polymer (x) or polymer (y) is relatively high, and then, the dispersion and a fluorinated solvent having a thickening effect are mixed without substantially lowering the concentration of the polymer (x) or polymer (y), whereby the viscosity of the liquid composition tends to be sufficiently high. And, the fluorinated solvent is, by being combined with the water and the hydrocarbon-type alcohol, capable of sufficiently thickening the liquid composition, and therefore, the viscosity of the liquid composition will be sufficiently high as compared with a conventional combination of a fluorinated solvent and a hydrocarbon-type alcohol, and a liquid composition containing no water. Therefore, according to the method for producing a liquid composition of the present invention, despite containing the polymer (x) or polymer (y) which is susceptible to cracking at the time of forming a solid polymer electrolyte membrane, it is possible to produce a liquid composition capable of making cracking less likely to occur at the time of forming a solid polymer electrolyte membrane.

<Coating Liquid for Forming Catalyst Layer>

The coating liquid for forming a catalyst layer, to be obtained by the production method of the present invention, is one comprising the polymer (x) or polymer (y), a catalyst and a dispersion medium, and is one having the polymer (x) or polymer (y) and the catalyst dispersed in a dispersion medium. The coating liquid for forming a catalyst layer may contain other components other than the polymer (x), the polymer (y), the catalyst and the dispersion medium, as the case requires, within a range not to impair the effects of the present invention.

(Catalyst)

The catalyst may, for example, be a supported catalyst having platinum or a platinum alloy supported on a carbon carrier. The carbon carrier may be carbon black powder.

(Dispersion Medium)

The dispersion medium in the coating liquid for forming a catalyst layer will be a mixture of a dispersion medium contained in the liquid composition and a dispersion medium contained in the dispersion of the catalyst as described below.

(Composition of Coating Liquid for Forming Catalyst Layer)

The solid content concentration in the coating liquid for forming a catalyst layer, may suitably adjusted so that the viscosity of the coating liquid for forming a catalyst layer becomes to be within the above-mentioned range. The mass ratio of the polymer (x) or polymer (y) and the catalyst may be suitably adjusted depending on the performance, etc. required for the catalyst layer.

<Method for Producing Coating Liquid for Forming Catalyst Layer>

The method for producing a coating liquid for forming a catalyst layer of the present invention, is a method which, in addition to the above-described step (α) and step (β), further has the following step (γ).

(γ) After said step (β), a step of mixing the liquid composition and the catalyst to prepare a coating liquid for forming a catalyst layer.

(Step (γ))

The coating liquid for forming a catalyst layer may be prepared, for example, by mixing and stirring the liquid composition in the present invention, and the catalyst or a dispersion of the catalyst. The coating liquid for forming a catalyst layer may contain other components other than the polymer (x), the polymer (y), the catalyst and the dispersion medium, as the case requires, within a range not to impair the effects of the present invention.

The dispersion of the catalyst is one having the catalyst dispersed in a dispersion medium.

The dispersion medium to be contained in the dispersion of the catalyst may, for example, be water, an organic solvent, etc., and preferred is a medium containing water and a hydrocarbon-type alcohol.

As the method for preparing the coating liquid for forming a catalyst layer, known methods may be mentioned. Specifically, a method of utilizing high speed rotation by a stirrer such as a homogenizer, a homomixer, etc., a high-speed rotation jet stream, a grinder, etc.; a method of imparting a shearing force to the coating liquid by extruding the coating liquid from a narrow portion by applying a high pressure of e.g. a high-pressure emulsifying apparatus; a method of dispersing a dispersoid in the dispersion medium by applying a high energy such as ultrasonic waves; a method of dispersing a dispersoid in the dispersion medium by collision of beads one another by a bead mill; etc. may be mentioned.

The temperature of the coating liquid during the preparation is preferably from 5 to 50° C., more preferably from 10 to 30° C.

In the method for producing a coating liquid for forming a catalyst layer of the present invention as described above, the liquid composition with a sufficiently high viscosity and the catalyst are mixed, whereby the viscosity of the coating liquid for forming a catalyst layer becomes to be sufficiently high. Therefore, according to the method for producing a coating liquid for forming a catalyst layer of the present invention, despite containing the polymer (x) or polymer (y) susceptible to cracking at the time of forming a catalyst layer, it is possible to produce a coating liquid for forming a catalyst layer which is capable of making cracking less likely to occur at the time of forming a catalyst layer.

<Membrane Electrode Assembly>

FIG. 1 is a schematic cross-sectional view showing an example of a membrane electrode assembly. A membrane electrode assembly 10 comprises an anode 13 having a catalyst layer 11 and a gas diffusion layer 12, a cathode 14 having a catalyst layer 11 and a gas diffusion layer 12, and a solid polymer electrolyte membrane 15 disposed between the anode 13 and the cathode 14, in a state in contact with the catalyst layers 11.

(Catalyst Layer)

The catalyst layer is a layer containing a catalyst and a polymer having an ion exchange group.

The polymer having an ion exchange group is, from the viewpoint of excellent chemical durability, preferably a fluorinated polymer having an ion exchange group, more preferably a perfluoro polymer having an ion exchange group, wherein hydrogen atoms bonded to carbon atoms are all substituted by fluorine atoms, further preferably the polymer (x) or polymer (y).

(Gas Diffusion Layer)

The gas diffusion layer has a function to uniformly diffuse a gas into the catalyst layer and a function as a current collector. The gas diffusion layer may, for example, be carbon paper, carbon cloth, carbon felt, etc. The gas diffusion layer is preferably treated for water repellency by e.g. polytetrafluoroethylene.

(Carbon Layer)

Figure 2:
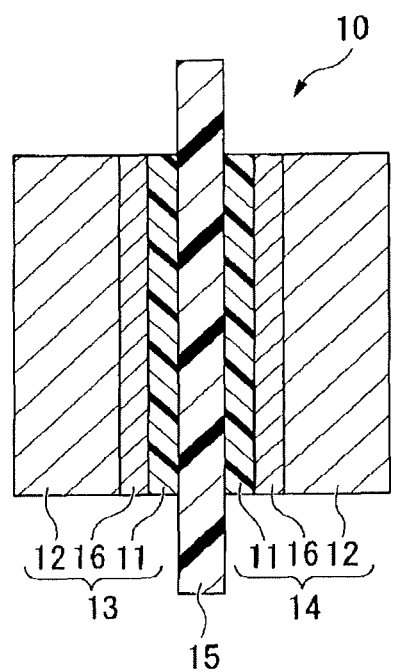
FIG. 2 is a schematic cross-sectional view showing another example of a membrane electrode assembly.

As shown in FIG. 2, the membrane electrode assembly 10 may have a carbon layer 16 between the catalyst layer 11 and the gas diffusion layer 12. By disposing the carbon layer, the gas diffusion property at the surface of the catalyst layer will be improved, and the power generation performance of the polymer electrolyte fuel cell will be substantially improved.

The carbon layer is a layer containing carbon and a nonionic fluorinated polymer. The carbon may, for example, be carbon particles, carbon fibers, etc., and carbon nanofibers having a fiber diameter of from 1 to 1,000 nm and a fiber length of at most 1,000 μm are preferred. The nonionic fluorinated polymer may, for example, be polytetrafluoroethylene, etc.

(Solid Polymer Electrolyte Membrane)

The solid polymer electrolyte membrane is a membrane comprising a polymer having an ion exchange group.

As the polymer having an ion exchange group, the above-mentioned perfluoro polymer having an ion exchange group may, for example, be mentioned, and the polymer (x) or polymer (y) is preferred.

The solid polymer electrolyte membrane may be reinforced with a reinforcing material. The reinforcing material may, for example, be porous material, fibers, woven fabrics, nonwoven fabrics, etc. The material for the reinforcing material may, for example, be polytetrafluoroethylene, a tetrafluoroethylene-hexafluoropropylene copolymer, a tetrafluoroethylene-perfluoro(alkyl vinyl ether) copolymer, polyethylene, polypropylene, polyphenylene sulfide, etc.

The solid polymer electrolyte membrane may, in order to further improve the durability, contain at least one type of atoms selected from the group consisting of cerium and manganese. Cerium and manganese will decompose hydrogen peroxide which is a substance causing deterioration of the solid polymer electrolyte membrane. Such cerium and manganese are preferably present in the form of ions in the solid polymer electrolyte membrane, and so long as they are present in the form of ions, they may be present in any state in the solid polymer electrolyte membrane.

<Method for Producing Membrane Electrode Assembly>

In a case where a membrane electrode assembly has no carbon layer, the membrane electrode assembly is produced, for example, by the following methods.

A method of forming a catalyst layer on a solid polymer electrolyte membrane to obtain a membrane catalyst layer assembly, and sandwiching the membrane catalyst layer assembly by gas diffusion layers.

A method of forming a catalyst layer on a gas diffusion layer to obtain an electrode (anode, cathode), and sandwiching a solid polymer electrolyte membrane by such electrodes.

In a case where the membrane electrode assembly has carbon layers, the membrane electrode assembly is produced, for example, by the following methods.

A method of applying a dispersion containing carbon and a nonionic fluorinated polymer, on a substrate film, followed by drying to form a carbon layer, forming a catalyst layer on the carbon layer, bonding the catalyst layer and a solid polymer electrolyte membrane, then peeling the substrate film to obtain a membrane-catalyst layer assembly having carbon layers, and sandwiching the membrane catalyst layer assembly by gas diffusion layers.

A method of applying a dispersion containing carbon and a nonionic fluorinated polymer, on a gas diffusion layer, followed by drying to form a carbon layer, and sandwiching a membrane catalyst layer assembly having a catalyst layer formed on a solid polymer electrolyte membrane, by such gas diffusion layers having a carbon layer.

First Embodiment of Method for Producing Membrane Electrode Assembly

The first embodiment of the method for producing a membrane electrode assembly of the present invention is a method further having the following step (δ) in addition to the above-described step (α) to step (γ).

Step (δ): After the step (γ), a step of forming either one or both of catalyst layers of the cathode and the anode, by using a coating liquid for forming a catalyst layer.

(Step (δ))

As the method for forming a catalyst layer in step (δ), the following methods may be mentioned.

A method of applying a coating liquid for forming a catalyst layer on a solid polymer electrolyte membrane, a gas diffusion layer or a carbon layer, followed by drying.

A method of applying a coating liquid for a catalyst layer on a substrate film, followed by drying to form a catalyst layer, and transferring the catalyst layer on a solid polymer electrolyte membrane.

Second Embodiment of Method for Producing Membrane Electrode Assembly

The second embodiment of the method for producing a membrane electrode assembly of the present invention, is a method further having the following step (ε) in addition to the above-described step (α) and step (β).

Step (ε): After the step (β), a step of forming a solid polymer electrolyte membrane by using a liquid composition.

(Step (ε))

The solid polymer electrolyte membrane may, for example, be formed by a method (casting method) which comprises applying a liquid composition on a substrate film or a catalyst layer, followed by drying.

In order to stabilize the polymer electrolyte membrane, it is preferred to perform annealing treatment. The temperature for the annealing treatment is preferably from 130 to 200° C. When the temperature for the annealing treatment is at least 130° C., the polymer (x) or polymer (y) tends not to be excessively hydrated. When the temperature for the annealing treatment is at most 200° C., thermal decomposition of ion exchange groups can be prevented.

In the method for producing a membrane electrode assembly of the present invention as described above, the liquid composition of the present invention is used for the formation of a catalyst layer or a solid polymer electrolyte membrane, whereby cracking is less likely to occur at the time of forming the catalyst layer or the solid polymer electrolyte membrane.

<Solid Polymer Electrolyte Fuel Cell>

A solid polymer electrolyte fuel cell is obtainable by disposing a separator with grooves formed as gas passages, on each side of a membrane electrode assembly.

As the separator, a separator made of various conductive material may be mentioned, such as a separator made of metal, a separator made of carbon, or a separator made of a material having graphite and a resin mixed.

In the solid polymer electrolyte fuel cell, power generation is performed by supplying a gas containing oxygen to the cathode, and supplying a gas containing hydrogen to the anode. Further, the membrane electrode assembly may be applied also to a methanol fuel cell wherein power generation is conducted by supplying methanol to the anode.

EXAMPLES

Hereinafter, the present invention will be described in detail with reference to Examples, but the present invention is not limited by these Examples. Here, Ex. 1 to 14 are Examples of the present invention, and Ex. 15 to 22 are Comparative Examples.

(Ion Exchange Capacity)

The ion exchange capacity of the polymer (x) or polymer (y) was obtained by the following method.

The polymer (x) or polymer (y) was put in a glove box and left for at least 24 hours in an atmosphere flushed with dry nitrogen, and dried. In the glove box, the dry weight of the polymer (x) or polymer (y) was measured.

The polymer (x) or polymer (y) was immersed in a 2 mol/L (liter) sodium chloride aqueous solution and left to stand at 60° C. for 1 hour, and then, cooled to room temperature. The sodium chloride aqueous solution in which the polymer (x) or polymer (y) had been immersed, was titrated with a 0.5 mol/L sodium hydroxide aqueous solution, to obtain the ion exchange capacity of the polymer (x) or polymer (y).

(Cracking of Catalyst Layer)

The presence or absence of cracking in the catalyst layer was visually confirmed and the evaluation was made in accordance with the following standards.

⊚ (excellent): The catalyst layer is formed without cracking, and light does not pass through the catalyst layer.

○ (good): Cracking of the catalyst layer is extremely small, and light slightly passes through the catalyst layer.

X (poor): Cracking of the catalyst layer is large, and the catalyst layer falls off from the substrate.

Compound (m11-1)

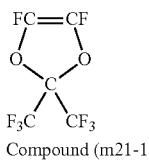
(m11-1)

Compound (m21-1)

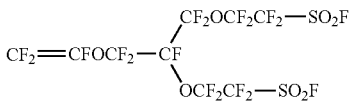
(m21-1)

Compound (m22-1)

$CF_2=CF-CF_2-O-CF_2CF_2-SO_3H$ (m22-1)

Compound (m22-2)

$CF_2=CF-O-CF_2CF_2-SO_3H$

Compound (m23)

$CF_2=CF-OCF_2CF(CF_3)-O-CF_2CF_2-SO_3H$ (Radical Initiator)
Compound (i-1): $(C_3F_7COO)_2$
Compound (i-2): $((CF_3)_3COO)_2$
Compound (i-3): azobisisobutyronitrile.
Compound (i-4): 2,2'-azobis(dimethyl isobutyrate) (manufactured by Wako Pure Chemical Industries, Ltd., V-601).

Compound (i-5): $((CH_3)_2CHOCOO)_2$ (manufactured by NOF Corporation, PEROYL (registered trademark) IPP).

(Solvents for production)
Compound (s-1): $CClF_2CF_2CHClF$
Compound (s-2): $CH_3CCl_2F$.
Compound (s-3): $CF_3CF_2CF_2CF_2CF_2CF_2H$ (manufactured by Asahi Glass Co., Ltd., ASAHIKLIN (registered trademark) AC-2000).
Compound (s-4): $CF_3CH_2OCF_2CF_2H$ (manufactured by Asahi Glass Co., Ltd., ASAHIKLIN (registered trademark) AE-3000).

(Fluorinated Solvents for Dispersion Medium)
Compound (d-1): 1,1,2,2,3,3,4-heptafluorocyclopentane (manufactured by ZEON Corporation, ZEORORA (registered trademark) H).
Compound (d-2): 1,1,2,2-tetrafluoroethyl-2,2,2-trifluoroethyl ether (manufactured by Asahi Glass Co., Ltd., ASAHIKLIN (registered trademark) AE-3000).

Production of Polymer (y-1):

Into a stainless steel autoclave having an internal capacity of 125 mL, 78.79 g of the compound (m21-1), 12.12 g of the compound (s-1) and 9.18 mg of the compound (i-3) were charged and, under cooling with liquid nitrogen, sufficiently degassed. Thereafter, the temperature was raised to 65° C., and TFE was introduced into the system, to maintain the pressure to be 1.15 MPaG. After stirring for 8.5 hours, the autoclave was cooled to stop the reaction.

The product was diluted with the compound (s-1), and then the compound (s-2) was added thereto, to agglomerate the polymer, followed by filtration. Thereafter, the polymer was stirred in the compound (s-1) and re-agglomerated by the compound (s-2), followed by drying at 80° C. under reduced pressure overnight, to obtain a polymer (y'-1). The composition of structural units constituting the polymer (y'-1), was obtained from the measurement of the ion exchange capacity.

The polymer (y'-1) was immersed for 40 hours in an aqueous solution of 50° C. containing 20 mass % of methanol and 15 mass % of potassium hydroxide, to let —SO$_2$F groups in the polymer (y'-1) be hydrolyzed and converted to —SO$_3$K groups. Then, the polymer was immersed in a 3 mol/L hydrochloric acid aqueous solution at room temperature for 2 hours. The hydrochloric acid aqueous solution was replaced, and the same treatment was repeated four more times, to obtain a polymer (y-1) wherein —SO$_3$K groups in the polymer were converted to sulfonic acid groups. The polymer (y-1) was sufficiently washed with ultrapure water. The ion exchange capacity of the polymer (y-1) was measured. The results are shown in Table 1.

Production of Polymer (y-2):

The polymer (y-2) was produced in the same manner as the polymer (y-1) except that the charged amounts of the respective monomers were changed so that the proportions of the respective structural units became to be the proportions shown in Table 1. The results are shown in Table 1.

Production of Polymer (y-3):

Into a stainless steel autoclave having an internal capacity of 125 mL, 41.80 g of the compound (m21-1), 24.47 g of the compound (m23-1), 7.77 g of the compound (s-3) and 7.45 mg of the compound (i-4) were charged and, under cooling with liquid nitrogen, sufficiently degassed. Thereafter, the temperature was raised to 66° C., and TFE was introduced into the system, to maintain the pressure to be 1.13 MPaG. After stirring for 5.5 hours, the autoclave was cooled to stop the reaction.

The product was diluted with the compound (s-3), and then, the compound (s-4) was added, to agglomerate the polymer, followed by filtration. Then, the polymer was washed with a mixed liquid of the compound (s-3): the compound (s-4)=1:9 (mass ratio) and dried at 80° C. under reduced pressure overnight, to obtain a polymer (y'-3). The composition of structural units constituting the polymer (y'-3) was analyzed by $^{19}$F-NMR. The results are shown in Table 1.

Using the polymer (y'-3), by the same method as for the polymer (y-1), —SO$_2$F groups were converted to sulfonic acid groups to obtain a polymer (y-3). The ion exchange capacity of the polymer (y-3) was measured. The results are shown in Table 1.

Production of Polymer (x-1):

Into a stainless steel autoclave having an internal capacity of 230 mL, 133.16 g of the compound (m21-1), 32.67 g of the compound (m11-1) and 14.1 g of the compound (s-3) were charged and, under cooling with liquid nitrogen, sufficiently degassed. 3.94 g of TFE was charged, the temperature was raised to 24° C., 40.17 mg of the compound (i-1) dissolved at a concentration of 2.8 mass % in the compound (s-1) was charged, and the charged line was washed with 1.1 g of the compound (s-3), to initiate the reaction. After stirring for 8 hours, the autoclave was cooled to stop the reaction.

The product was diluted with the compound (s-3), and then, it was mixed with a mixed liquid of the compound (s-3): methanol=8:2 (mass ratio), to agglomerate the polymer, followed by filtration. The polymer was washed in a mixed liquid of the compound (s-3): methanol=7:3 (mass ratio), and after separation by filtration, the solid content was dried at 80° C. overnight under reduced pressure, to obtain a polymer (x'-1). The composition of structural units constituting the polymer (x'-1), was analyzed by $^{19}$F-NMR. From the composition calculated by $^{19}$F-NMR, the ion-exchange capacity of the polymer (x-1) was obtained. The results are shown in Table 1.

Production of Polymers (x-2) and (x-3):

The polymers (x-2) and (x-3) were produced in the same manner as in the case of the production of the polymer (x-1) except that the charged amounts of the respective monomers were changed so that the proportions of the respective structural units became to be the proportions shown in Table 1. The results are shown in Table 1.

Production of Polymer (x-4):

Into a stainless steel autoclave having an internal capacity of 230 mL, 203.6 g of the compound (m21-1) and 39.73 g of the compound (m11-1) were charged and, under cooling with liquid nitrogen, sufficiently degassed. The temperature was raised to 24° C., 72.95 mg of the compound (i-1) dissolved at a concentration of 2.8 mass % in the compound (s-1) was charged, the charged line was washed with 1.4 g of the compound (s-3), and after stirring for 24 hours, the autoclave was cooled to stop the reaction.

The product was diluted with the compound (s-1), and then, it was mixed with a mixed liquid of the compound (s-3): methanol=7:3 (mass ratio), to agglomerate the polymer, followed by solid-liquid separation by decantation. The polymer was washed in a mixed liquid of the compound (s-3): methanol=7:3 (mass ratio), and after solid-liquid separation by decantation, the solid content was dried at 80° C. overnight under reduced pressure, to obtain the polymer (x'-4). The composition of structural units constituting the polymer (x'-4), was analyzed by $^{19}$F-NMR. From the composition calculated by $^{19}$F-NMR, the ion exchange capacity of the polymer (x-4) was obtained. The results are shown in Table 1.

Production of Polymer (x-5):

In a stainless steel autoclave having an internal capacity of 230 mL, 198.97 g of the compound (m23-1), 29.48 g of the compound (m11-1) and 68.63 mg of the compound (i-5) were charged and, under cooling with liquid nitrogen, sufficiently degassed. 6.79 g of TFE was charged, the temperature was raised to 40° C., and after stirring for 24 hours, the autoclave was cooled to stop the reaction.

The product was diluted with the compound (s-1), and then n-hexane was added thereto, to agglomerate the polymer, followed by filtration. The polymer was stirred in the compound (s-1) and re-agglomerated by n-hexane, and the solid content was dried at 80° C. under reduced pressure overnight, to obtain a polymer (x'-5). The composition of structural units constituting the polymer (x'-5), was analyzed by $^{19}$F-NMR. The results are shown in Table 1.

From the composition calculated by $^{19}$F-NMR, the ion-exchange capacity of the polymer (x-5) was obtained. The results are shown in Table 1.

Production of Polymer (y-4):

Into a stainless steel autoclave having an internal capacity of 230 mL, 175.0 g of the compound (m22-1), 8.48 g of the compound (s-3) and 55.1 mg of the compound (i-2) were charged and, under cooling with liquid nitrogen, sufficiently degassed. Thereafter, the temperature was raised to 105° C., nitrogen gas was introduced to bring the pressure to be 0.28 MPaG. After confirming the stability of the pressure, TFE was introduced into the system, and the pressure was maintained to be 0.60 MPaG. After stirring for 6 hours, the autoclave was cooled to stop the reaction.

The product was diluted with the compound (s-3), and the compound (s-4) was added thereto, to agglomerate the polymer, followed by filtration. Then, the polymer was washed with a mixed liquid of the compound (s-3): the compound (s-4)=1:9 (mass ratio) and dried at 80° C. under reduced pressure overnight, to obtain a polymer (y'-4).

The composition of structural units constituting the polymer (y'-4), was obtained from the measurement of the ion-exchange capacity.

Using the polymer (y'-4), in the same manner as for the polymer (y-1), —SO$_2$F groups were converted to sulfonic acid groups to obtain a polymer (y-4). The ion exchange capacity of the polymer (y-4) was measured. The results are shown in Table 1.

Production of Polymer (y-5):

Into a stainless steel autoclave having an internal capacity of 125 mL, 84.97 g of the compound (m22-2), 6.0 g the compound (s-1) and 25.6 mg of the compound (i-1) dissolved at a concentration of 2.8 mass % in the compound (s-1) were charged and, under cooling with liquid nitrogen, sufficiently degassed. Thereafter, the temperature was raised to 24° C., and TFE was introduced into the system, to maintain the pressure to be 0.47 MPaG. After stirring for 10 hours, the autoclave was cooled to stop the reaction.

The product was diluted with the compound (s-1), and the compound (s-2) was added thereto, to agglomerate the polymer, followed by filtration. Thereafter, the polymer was stirred in the compound (s-1) and re-agglomerated by the compound (s-2), followed by drying at 80° C. under reduced pressure overnight, to obtain a polymer (y'-5). The composition of structural units constituting the polymer (y'-5), was obtained from the measurement of the ion exchange capacity.

Using the polymer (y'-5), in the same manner as for the polymer (y-1), —SO$_2$F groups were converted to sulfonic acid groups to obtain a polymer (y-5). The ion exchange capacity of the polymer (y-5) was measured. The results are shown in Table 1.

Production of Polymer (z-1):

Into a stainless steel autoclave having an internal capacity of 230 mL, 100.41 g of the compound (m23-1), 55.0 g of the compound (s-3) and 15.5 mg of the compound (i-4) were charged and, under cooling with liquid nitrogen, sufficiently degassed. Thereafter, the temperature was raised to 70° C., and TFE was introduced into the system, to maintain the pressure to be 1.00 MPaG. After stirring for 8.5 hours, the autoclave was cooled to stop the reaction.

The product was diluted with the compound (s-3), and then, the compound (s-4) was added thereto, to agglomerate the polymer, followed by filtration. Then, the polymer was washed with a mixed liquid of the compound (s-3): the compound (s-4)=1:9 (mass ratio) and dried at 80° C. under reduced pressure overnight, to obtain a polymer (z'-1). The composition of structural units constituting the polymer (z'-1) was obtained from the measurement of the ion-exchange capacity.

Using the polymer (z'-1), in the same manner as for the polymer (y-1), —SO$_2$F groups were converted to sulfonic acid groups to obtain a polymer (z-1). The ion exchange capacity of the polymer (z-1) was measured. The results are shown in Table 1.

followed by mixing by using a planetary centrifugal mixer (manufactured by THINKY CORPORATION, ARE-310) at 25° C., at a revolution rate of 2,000 rpm at a rotation rate of 800 rpm for 5 minutes, to prepare a liquid composition. The results are shown in Table 2.

Step (γ):

To 10 g of a catalyst (manufactured by Tanaka Kikinzoku Kogyo K.K.) having platinum supported on a carbon carrier (specific surface area: 800 m$^2$/g) so as to be contained in an amount of 50 mass % in the total mass of the catalyst, 55 g of ultrapure water was added, followed by irradiation with ultrasonic waves for 10 minutes, to prepare a dispersion of the catalyst. Thereto, 44 g of the above liquid composition was added to set the mass ratio of the polymer (y-1) to the catalyst carbon (polymer (y-1)/catalyst carbon) to be 0.8, and further 66 g of ethanol was added to bring the solid content concentration to be 8 mass %, to obtain a coating liquid for forming a catalyst layer.

Step (δ):

The above coating liquid for forming a catalyst layer was applied to a sheet (manufactured by Asahi Glass Co., Ltd., Aflex (registered trademark) 100 N, thickness: 100 μm) made of an ethylene-tetrafluoroethylene copolymer, so that

TABLE 1

| Polymers | Structural units [mol %] | | | | | | Polymers | Ion exchange capacity |
|---|---|---|---|---|---|---|---|---|
| (x') to (z') | (m11-1) | (m21-1) | (m22-1) | (m22-2) | (m23-1) | TFE | (x) to (z) | [meq/g dry resin] |
| (y'-1) | — | 15 | — | — | — | 85 | (y-1) | 1.64 |
| (y'-2) | — | 20 | — | — | — | 80 | (y-2) | 1.97 |
| (y'-3) | — | 10 | — | — | 8 | 82 | (y-3) | 1.51 |
| (x'-1) | 67 | 18 | — | — | — | 15 | (x-1) | 1.23 |
| (x'-2) | 50 | 15 | — | — | — | 35 | (x-2) | 1.17 |
| (x'-3) | 50 | 20 | — | — | — | 30 | (x-3) | 1.47 |
| (x'-4) | 74 | 26 | — | — | — | — | (x-4) | 1.50 |
| (x'-5) | 45 | — | — | — | 30 | 25 | (x-5) | 1.15 |
| (y'-4) | — | — | 15 | — | — | 85 | (y-4) | 1.18 |
| (y'-5) | — | — | — | 22 | — | 78 | (y-5) | 1.59 |
| (z'-1) | — | — | — | — | 18 | 82 | (z-1) | 1.10 |

(Ex. 1)

Step (α):

The polymer (y-1) and a mixed solvent of water, ethanol and 1-butanol (water/ethanol/1-butanol=70/20/10 mass ratio) were stirred at 115° C. for 8 hours at a rotation speed of 150 rpm by using an autoclave manufactured by Hastelloy, to prepare a dispersion wherein the concentration of the polymer (y-1) became 10 mass %.

Step (β):

The above dispersion and the compound (d-1) were mixed so that the sum of the concentration of the polymer (y-1) and the concentration the compound (d-1) became 18 mass %, a catalyst layer with a platinum amount of 0.2 mg/cm$^2$ would be formed, followed by drying at 80° C. for 10 minutes to form a catalyst layer. The presence or absence of cracking in the catalyst layer was confirmed. The results are shown in Table 2.

(Ex. 2 to 22)

In the same manner as in Ex. 1 except that the type of the polymer, the type of the medium and their proportions used in step (α) and step (β) were changed as shown in Table 2, a coating liquid for forming a catalyst layer was obtained, and a catalyst layer was formed. The results are shown in Table 2.

TABLE 2

| | | Strep (α) | | | Step (β) | | |
|---|---|---|---|---|---|---|---|
| Ex. | Polymers (x) to (z) | Hydrocarbon type alcohol | Water/ hydrocarbon type alcohol [mass ratio] | Polymer concentration [mass %] | Fluorinated solvent | Polymer + fluorinated solvent concentration [mass %] | Step (δ) Cracking of catalyst layer |
| 1 | (y-1) | EtOH/BuOH | 70/(20/10) | 10 | (d-1) | 18 | ⊚ |
| 2 | (y-2) | EtOH | 68/32 | 15 | (d-1) | 20 | ○ |
| 3 | (y-3) | EtOH | 64/36 | 24 | (d-1) | 30 | ⊚ |
| 4 | (y-3) | EtOH | 64/36 | 24 | (d-2) | 31 | ○ |
| 5 | (x-1) | PrOH | 50/50 | 18 | (d-1) | 22 | ○ |

TABLE 2-continued

| | | | Strep (α) | | | Step (β) | |
|---|---|---|---|---|---|---|---|
| Ex. | Polymers (x) to (z) | Hydrocarbon type alcohol | Water/ hydrocarbon type alcohol [mass ratio] | Polymer concentration [mass %] | Fluorinated solvent | Polymer + fluorinated solvent concentration [mass %] | Step (δ) Cracking of catalyst layer |
| 6 | (x-1) | PrOH | 50/50 | 18 | (d-1) | 25 | ○ |
| 7 | (x-1) | PrOH | 50/50 | 18 | (d-1) | 29 | ⊙ |
| 8 | (x-1) | PrOH | 50/50 | 18 | (d-2) | 24 | ○ |
| 9 | (x-2) | EtOH/PrOH | 47/(14/39) | 12 | (d-1) | 20 | ⊙ |
| 10 | (x-3) | EtOH | 53/47 | 23 | (d-1) | 27 | ○ |
| 11 | (x-4) | PrOH | 43/57 | 16 | (d-1) | 24 | ○ |
| 12 | (x-5) | EtOH | 53/47 | 26 | (d-1) | 34 | ○ |
| 13 | (y-4) | EtOH | 57/43 | 17 | (d-1) | 25 | ⊙ |
| 14 | (y-5) | EtOH | 46/54 | 15 | (d-1) | 19 | ○ |
| 15 | (z-1) | EtOH | 14/86 | 10 | (d-1) | 35 | X |
| 16 | (y-3) | EtOH | 64/36 | 8 | (d-1) | 23 | X |
| 17 | (y-3) | EtOH | 64/36 | 10 | (d-1) | 11 | X |
| 18 | (y-3) | EtOH | 64/36 | 26 | (d-1) | 38 | — |
| 19 | (x-3) | EtOH | 53/47 | 23 | — | 23 | X |
| 20 | (x-3) | EtOH | 53/47 | 8 | (d-1) | 25 | X |
| 21 | (x-3) | EtOH | 53/47 | 23 | (d-1) | 37 | X |
| 22 | (y-5) | — | 100/0 | 12 | (d-1) | 20 | — |

EtOH: ethanol,
PrOH: 1-propanol,
BuOH: 1-butanol

In Ex. 1 to 14, a dispersion having a concentration of the polymer (x) or polymer (y) of from 10 to 26 mass % and a fluorinated solvent were mixed so that the sum of the concentration of the polymer (x) or polymer (y) and the concentration of the fluorinated solvent became to be from 12 to 35 mass %, to prepare a liquid composition, whereby the viscosity of the liquid composition and the coating liquid for forming a catalyst layer became to be sufficiently high, and cracking was less likely to occur at the time of forming the catalyst layer.

In Ex. 15, the polymer (z-1) less likely to be thickened was used, whereby the viscosity of the liquid composition and the coating liquid for forming a catalyst layer did not become sufficiently high, and cracking was likely to occur at the time of forming the catalyst layer.

In Ex. 16 and 20, the concentration of the polymer (x) or polymer (y) in the dispersion was less than 10 mass %, whereby the viscosity of the liquid composition and the coating liquid for forming a catalyst layer did not become sufficiently high, and cracking was likely to occur at the time of forming the catalyst layer.

In Ex. 17, the sum of the concentration of the polymer (x) or polymer (y) and the concentration of the fluorinated solvent in the liquid composition was less than 12 mass %, the viscosity of the liquid composition and the coating liquid for forming a catalyst layer did not become to be sufficiently high, and cracking was likely to occur at the time of forming the catalyst layer.

In Ex. 18, the sum of the concentration of the polymer (x) or polymer (y) and the concentration of the fluorinated solvent in the liquid composition exceeded 35 mass %, whereby the viscosity of the liquid composition became too high, and it was not possible to uniformly disperse it in the coating liquid for forming a catalyst layer, and it was not possible to use it to form the catalyst layer.

In Ex. 19, a fluorinated solvent was not used as a dispersion medium, whereby the viscosity of the liquid composition and the coating liquid for forming a catalyst layer did not become to be sufficiently high, and cracking was likely to occur at the time of forming the catalyst layer.

In Ex. 21, the sum of the concentration of the polymer (x) or polymer (y) and the concentration of the fluorinated solvent in the liquid composition exceeded 35 mass %, whereby the viscosity of the liquid composition became to be too high, and it was not possible to uniformly disperse it in the coating liquid for forming a catalyst layer, and it was not possible to use it to form the catalyst layer.

In Ex. 22, a hydrocarbon-type alcohol was not used as the dispersion medium, whereby the liquid composition became non-uniform, and it was not possible to use it to form the catalyst layer.

INDUSTRIAL APPLICABILITY

The liquid composition of the present invention is useful as a raw material at the time of forming a catalyst layer or a solid polymer electrolyte membrane in a membrane electrode assembly.

REFERENCE SYMBOLS

10: electrode assembly, 11: catalyst layer, 12: gas diffusion layer, 13: anode, 14: cathode, 15: solid polymer electrolyte membrane, 16: carbon layer.

What is claimed is:

1. A method for producing a liquid composition, which comprises dispersing a polymer (x) having a structural unit having a ring structure and a structural unit having an ion exchange group, or a polymer (y) (excluding the polymer (x)) having either one or both of a structural unit having two ion exchange groups in a pendant group and a structural unit represented by the following formula (u22), in a medium containing water and a hydrocarbon-type alcohol (but not including a fluorinated solvent), to prepare a dispersion wherein the concentration of the polymer (x) or the polymer (y) is from 10 to 26 mass %, and mixing the dispersion and a fluorinated solvent so that the sum of the concentration of the polymer (x) or the polymer (y) and the concentration of the fluorinated solvent becomes to be from 12 to 35 mass %, to prepare a liquid composition:

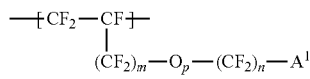
(u22)

wherein m is 0 or 1, provided that when p is 0, m is 0, p is 0 or 1, n is an integer of from 1 to 12, and $A^1$ is an ion exchange group.

2. The method for producing a liquid composition according to claim 1, wherein the ion exchange group is a sulfonic acid group.

3. The method for producing a liquid composition according to claim 1, wherein the structural unit having a ring structure is at least one member selected from the group consisting of the following units (u11) to (u14):

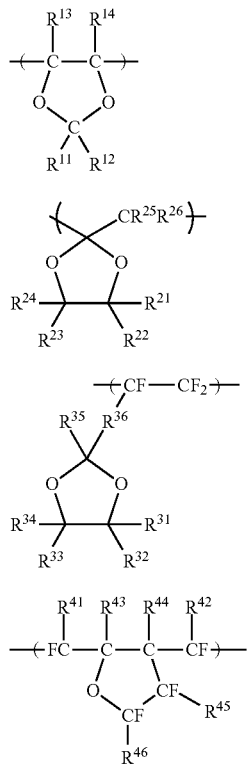

wherein $R^{11}$ and $R^{12}$ are each independently a fluorine atom or a $C_{1-5}$ perfluoroalkyl group, $R^{13}$ and $R^{14}$ are each independently a fluorine atom, a $C_{1-5}$ perfluoroalkyl group or a $C_{1-5}$ perfluoroalkoxy group, $R^{21}$ to $R^{26}$ are each independently a monovalent perfluoro organic group which optionally comprises an etheric oxygen atom, or a fluorine atom, $R^{31}$ to $R^{35}$ are each independently a fluorine atom, a $C_{1-6}$ perfluoroalkyl group or a $C_{2-6}$ perfluoroalkyl group having an etheric oxygen atom between carbon-carbon atoms, $R^{36}$ is a single bond, a $C_{1-6}$ perfluoroalkylene group or a $C_{2-6}$ perfluoroalkylene group having an etheric oxygen atom between carbon-carbon atoms, and $R^{41}$ to $R^{46}$ are each independently a monovalent perfluoro organic group which optionally comprises an etheric oxygen atom, or a fluorine atom.

4. The method for producing a liquid composition according to claim 1, wherein the structural unit having an ion exchange group is at least one member selected from the group consisting of the following units (u21) to (u23):

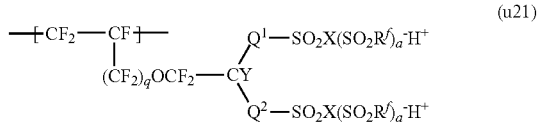
(u21)

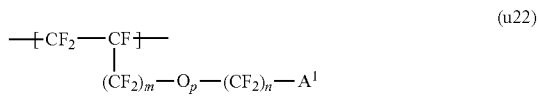
(u22)

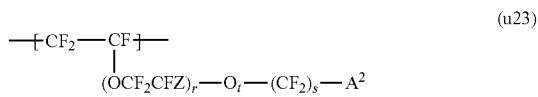
(u23)

wherein $Q^1$ is a perfluoroalkylene group which may have an etheric oxygen atom, $Q^2$ is a single bond or a perfluoroalkylene group which may have an etheric oxygen atom, Y is a fluorine atom or a monovalent perfluoro organic group, $R^f$ is a linear or branched perfluoroalkyl group which optionally comprises an etheric oxygen atom, X is an oxygen atom, a nitrogen atom or a carbon atom, provided that when X is an oxygen atom, a=0, when X is a nitrogen atom, a=1, and when X is a carbon atom, a=2, and q is 0 or 1; m is 0 or 1, provided when p is 0, m is 0, p is 0 or 1, n is an integer of from 1 to 12, and $A^1$ is an ion exchange group; Z is a fluorine atom or a trifluoromethyl group, r is an integer of from 1 to 3, t is 0 or 1, s is an integer of from 1 to 12, and $A^2$ is an ion exchange group.

5. The method for producing a liquid composition according to claim 1, wherein the structural unit having two ion exchange groups in a pendant group is a structural unit represented by the following formula (u21):

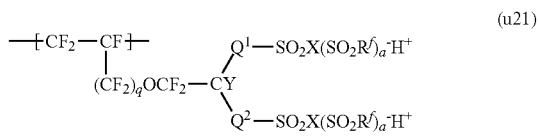
(u21)

wherein q is 0 or 1, Y is a fluorine atom or a monovalent perfluoro organic group, $Q^1$ is a perfluoroalkylene group which optionally comprises an etheric oxygen atom, $Q^2$ is a single bond or a perfluoroalkylene group which may have an etheric oxygen atom, $R^f$ is a perfluoroalkyl group which may have an etheric oxygen atom, X is an oxygen atom, a nitrogen atom or a carbon atom, provided that when X is an oxygen atom, a=0, when X is a nitrogen atom, a=1, and when X is a carbon atom, a=2.

6. The method for producing a liquid composition according to claim 3, wherein the structural unit having a ring structure is a structural unit represented by the following formula (u11):

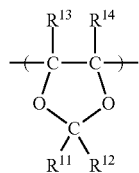

(u11)

wherein $R^{11}$ and $R^{12}$ are each independently a fluorine atom or a $C_{1-5}$ perfluoroalkyl group, and $R^{13}$ and $R^{14}$ are each independently a fluorine atom, a $C_{1-5}$ perfluoroalkyl group or a $C_{1-5}$ perfluoroalkoxy group.

7. The method for producing a liquid composition according to claim 1, wherein the fluorinated solvent is at least one solvent selected from the group consisting of hydrofluoroethers and hydrofluorocarbons.

8. The method for producing a liquid composition according to claim 1, wherein the hydrocarbon-type alcohol is at least one $C_{1-4}$ hydrocarbon-type alcohol.

9. The method for producing a liquid composition according to claim 8, wherein the hydrocarbon-type alcohol is either one or both of ethanol and 1-propanol.

10. A method for producing a coating liquid for forming a catalyst layer, which comprises preparing a liquid composition by the method for producing a liquid composition as defined in claim 1, and mixing the liquid composition and a catalyst to prepare a coating liquid for forming a catalyst layer.

11. A method for producing a membrane electrode assembly for a solid polymer fuel cell comprising an anode having a catalyst layer, a cathode having a catalyst layer and a solid polymer electrolyte membrane disposed between the anode and the cathode, which comprises preparing a coating liquid for forming a catalyst layer by the method for producing a coating liquid for forming a catalyst layer as defined in claim 10, and forming, by using the coating liquid, either one or both of the catalyst layers of the cathode and the anode.

12. A method for producing a membrane electrode assembly for a solid polymer fuel cell comprising an anode having a catalyst layer, a cathode having a catalyst layer and a solid polymer electrolyte membrane disposed between the anode and the cathode, which comprises preparing a liquid composition by the method for producing a liquid composition as defined in claim 1, and preparing the solid polymer electrolyte membrane by using the liquid composition.

\* \* \* \* \*